United States Patent

Blais et al.

[11] Patent Number: 5,979,276
[45] Date of Patent: Nov. 9, 1999

[54] SKIVING APPARATUS AND METHODS

[75] Inventors: Sean M. Blais; Russell L. Cummings, both of Ponca City, Okla.

[73] Assignee: Mertz, Inc., Ponca City, Okla.

[21] Appl. No.: 09/024,175

[22] Filed: Feb. 17, 1998

[51] Int. Cl.$^6$ ................... B23B 3/22; B23B 5/04
[52] U.S. Cl. ................... 82/113; 82/1.11; 82/59; 83/59; 83/188
[58] Field of Search ................... 82/1.11, 59, 71, 82/113; 83/59, 184, 188, 195, 869; 81/9.41, 9.51

[56] References Cited

U.S. PATENT DOCUMENTS

| | | | |
|---|---|---|---|
| 2,641,944 | 6/1953 | Laffoon | 82/59 |
| 3,354,762 | 11/1967 | Wolff | 81/9.41 |
| 3,433,106 | 3/1969 | Matthews | 81/9.41 |
| 3,759,121 | 9/1973 | Rassi et al. | |
| 3,811,347 | 5/1974 | Heckhausen | |
| 3,820,421 | 6/1974 | Anderson et al. | |
| 3,938,215 | 2/1976 | Anderson et al. | |
| 3,965,570 | 6/1976 | Kozulla | |
| 4,000,552 | 1/1977 | Pleis | |
| 4,592,253 | 6/1986 | Hatfield | 81/9.41 |

OTHER PUBLICATIONS

Catalog JA316D, Fluid Products Handbook: Industrial Connectors; copyright 1996, Aeroquip Corp., Maumee, OH, pp. 236, 253–254 & 262.

Primary Examiner—Andrea L. Pitts
Assistant Examiner—Toan Le
Attorney, Agent, or Firm—Fellers, Snider, Blankenship, Bailey & Tippens, P.C.

[57] ABSTRACT

A skiving apparatus for simultaneously skiving the outer and inner surfaces of an end of reinforced hose. The apparatus comprises an outer diameter cutting tool, an internal skiving mandrel and a bracket for holding the outer diameter cutting tool and the internal skiving mandrel in a substantially perpendicular relation. The internal skiving mandrel has a nose for coaxially receiving a hose end thereover, spiral cutting threads and a stop collar. To achieve the desired simultaneous skiving effect, the internal skiving mandrel and the outer diameter cutting tool have a coincident cutting direction. Thus, when the hose is fed over the mandrel and the apparatus is rotated the simultaneous skiving of the inner and outer surfaces of the hose is accomplished.

11 Claims, 4 Drawing Sheets

SKIVING APPARATUS AND METHODS

BACKGROUND OF THE INVENTION

1. Field of the Invention

This invention relates generally to preparing the end of a hydraulic or other reinforced hose to receive a coupling, and, more specifically, to the simultaneous skiving of the outer and inner surfaces of a hose end.

2. Background

High pressure hydraulic and pneumatic hoses are typically constructed with one to six layers of spiral wrapped steel wire reinforcement embedded in the walls. A simplified model useful for conceptualization is an inside rubber tube spirally wrapped with steel wire, covered by an outer rubber tube. In practice, the parts of the hose are bonded together, more or less as reinforced tire parts are bonded, into a single unit.

The hose is usually manufactured in long lengths supplied in coiled form to manufacturers who cut to the desired length. Connectors or "fittings" are fastened to the ends of hoses to allow convenient and leak free coupling. Fittings are available in many styles for differing applications and preferences. Two classes of connectors are "reusable" and "crimp" fittings.

Reusable fittings consist substantially of two parts, a "socket" which slips over the outside of a prepared hose and threads onto the second part, a "nipple" which has a tube that slips inside the prepared hose. Crimp fittings are similar except that threads are omitted and slips inside the prepared hose. Crimp fittings are similar except that threads are omitted and the outer socket is of thinner steel material which may be squeezed and formed (crimped) to tightly secure the fitting to the end of the hose. Some of the same equipment and processes apply to both types of fittings.

In preparation for attaching certain fittings, some rubber material is removed from both the outside diameter and the inside diameter of the hose. This preparation serves to minimize the outside diameter of the fitting, minimize flow restriction by increasing the inside diameter of the hose before inserting the nipple, and strengthen the fitting's grip on the hose.

For high pressure applications, reusable fittings typically require skiving the outside of the hose only, while crimp fittings typically require removing a portion of both the inside and the outside of the hose. Thus, the present invention has its primary application in preparing hose ends for installation of crimp fittings, although it is not limited to this application.

The process of removing a portion of either the outer or inner surfaces of a hose end is called skiving. External skiving compares to stripping or peeling. Internal skiving compares to boring or reaming. Heretofore, devices and methods for skiving have focused singularly on preparing either the outer diameter or inner diameter of the hose end, but not both.

The most elementary way to skive the outer surface of reinforced hose is with knife and pliers. The knife and pliers method is a manual method where a ring is cut around the hose end with a knife down to the wire reinforcement braid and a slit is made from the ring to the hose end. The outer layer of rubber is then peeled off with pliers. To speed up the process, special "external skiving tools" have been developed, and are well-known in industry.

One well accepted external skiving tool consists of three major parts. The first part is a mandrel with a beveled nose which fits inside the hose to steady it and allow precise control of the cutting depth. The mandrel also has a machined stop to control the length of hose to be skived. The tail end, beyond the stop, is a gripping portion, normally cylindrical, made to be gripped in a spindle. An angled bracket is clamped to the mandrel. It extends from the axis of the mandrel to clamp and hold an outer diameter cutting tool normal to the surface of the hose. The cutting tool is adjusted and clamped to skive the outside of the hose. As the tool is turned and the mandrel is inserted into the end of a hose, the cutting tool makes a cut normal to the hose with one cutting blade, and a second cut to skin or skive the hose with another blade.

Prior methods of skiving the outside diameter of a hose end with the described external skiving tool are:

(a) manual—An appropriate sized skiving tool for the hose size is selected and mounted in a vise. The hose end is slipped over the mandrel until the hose contacts the skiving blade of the outer diameter cutting tool. The hose is pushed and turned clockwise to skive the outside diameter until the hose bottoms on the stop. The tool is withdrawn and the hose end cleaned.

(b) manual with "speed handle"—The hose is clamped in a vise and the skiving tool is attached to a "speed handle," a device similar to the brace of a hand drill. The mandrel is pushed into the hose and turned clockwise with the speed handle until the mandrel stop bottoms on the hose. The tool is withdrawn and the hose end cleaned.

(c) by machine—The skiving tool is mounted in the spindle of a turning machine and the spindle is started counterclockwise (as looking at the spindle from the front). The hose is pushed over the mandrel of the skiving tool by hand, preferably mounted in a vise which slides parallel to the axis of the spindle, until the hose bottoms on the mandrel stop. The hose end is then withdrawn and cleaned.

Special tools called "internal skiving tools" are likewise well-known in the industry for trimming the inner surface of a hose end. The typical internal skiving tool has a nose portion with a beveled end for easy insertion into the hose end. Behind the nose are sharpened threads which screw into the inside wall of the hose and cut it. A stop on the tool aids skiving to the desired depth from the end of the hose. A desired cylindrical ring section is pulled out when the tool is retracted. The tail end, beyond the stop, is a gripping portion which may be hexagonal for secure gripping in a spindle, or vise.

Prior methods of skiving the inside diameter of a hose end with the described internal skiving tool are:

(a) manual—The appropriate sized skiving tool is selected and clamped in a vise. The hose is pushed over the end of the skiving tool until it contacts the cutting threads. The hose is pushed and turned counterclockwise until it bottoms on the tool. The hose end is then withdrawn and cleaned.

(b) manual with "speed handle"—The hose is clamped in a vise while the tool is attached to a speed handle. The tool is then inserted into the hose end and turned counterclockwise with the speed handle until it bottoms on the hose. The tool is withdrawn and the hose end cleaned.

(c) by machine—The skiving tool is mounted in the spindle of a turning machine and the spindle started clockwise (as looking at the spindle from the front). The hose is pushed over the mandrel of the skiving tool by hand, preferably mounted in a vise which slides parallel to the axis of the spindle, until the hose bottoms on the stop. The hose end is then withdrawn and cleaned.

In the patent art, Rassi and Dick, in U.S. Pat. No. 3,759,121, describe a self-contained machine including dual opposed chisel-type cutters for skiving the outside of a hose end. Beckhausen, in U.S. Pat. No. 3,811,347, discloses a device with guide rods and rollers and one or more cutting blades to strip material from the outside of a hydraulic hose end. Anderson et al., in U.S. Pat. Nos. 3,820,421 and 3,938,215, describe an apparatus for skiving the outside of the end of a piece of reinforced hose while vacuuming the inside of the hose to recover particulate debris. U.S. Pat. No. 3,965,570 to Kozulla discloses a tool for skiving the outside diameter of the end of a hydraulic hose with an adjustable chisel-type cutter and a mandrel which fits inside the hose for support. Plies, in U.S. Pat. No. 4,000,552, describes a machine which buffs the exterior surface of the end of a hose with a wire brush to make the exterior concentric with the interior and to prepare it for a coupling.

An important limitation of conventional skiving devices and methods is that the outer and inner hose end surfaces must be prepared in separate operations. None of the known skiving apparatus is capable of performing double duty as both an outer and inner diameter skiving tool, much less simultaneously skiving both the inner and outer hose end surfaces. This requirement of multiple skiving operations increases handling time, adds to equipment requirements, and decreases worker productivity.

It is thus an object of the present invention to provide a device and method for the simultaneous skiving of both the outside and inside of a hose end.

It is a further object of the invention that the device be capable of use with conventional turning machines, such as portable reusable hose assembly machines, operating, for example, at 15 rpm.

SUMMARY OF THE INVENTION

These and other objects are achieved in a skiving apparatus that comprises an outer diameter cutting tool, an internal skiving mandrel and a bracket for holding the outer diameter cutting tool and the internal skiving mandrel in a substantially perpendicular relation. The internal skiving mandrel has a nose for coaxially receiving a hose end thereover, spiral cutting threads and a stop collar. To achieve the desired simultaneous skiving effect, the internal skiving mandrel and the outer diameter cutting tool have a coincident cutting direction. Thus, when the hose is fed over the mandrel and either the hose or the apparatus is rotated the simultaneous skiving of the inner and outer surfaces of the hose is accomplished. Savings in handling time results in markedly increased worker, equipment and shop productivity.

In operation, the hose end is pushed over the nose of the internal skiving mandrel and either the hose or the skiving apparatus is rotated in the cutting direction until the end bottoms on the stop collar. Once in place on the nose of the internal skiving mandrel, the hose is advanced, whereupon the hose end first contacts the outer diameter cutting tool, and subsequently the spiral cutting threads of the internal skiving mandrel to achieve the desired simultaneous skiving of the inner and outer hose end surfaces. After the skiving is complete, the end of the hose is withdrawn and cleaned.

In its most preferred operation, the internal skiving mandrel is coupled to the spindle of a reusable hose assembly machine or other turning machine and the spindle is rotated. The end of the hose is then pushed over the nose of the mandrel until the end bottoms on the stop collar. In the most preferred mode, the hose is clamped in a longitudinally movable clamping fixture to better control the advance of the hose upon the mandrel and prevent the hose from rotating.

A better understanding of the present invention, its several aspects, and its objects and advantages will become apparent to those skilled in the art from the following detailed description, taken in conjunction with the attached drawings, wherein there is shown and described the preferred embodiment of the invention, simply by way of illustration of the best mode contemplated for carrying out the invention.

DETAILED DESCRIPTION OF THE PREFERRED EMBODIMENT

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

The Apparatus

Figure 1:
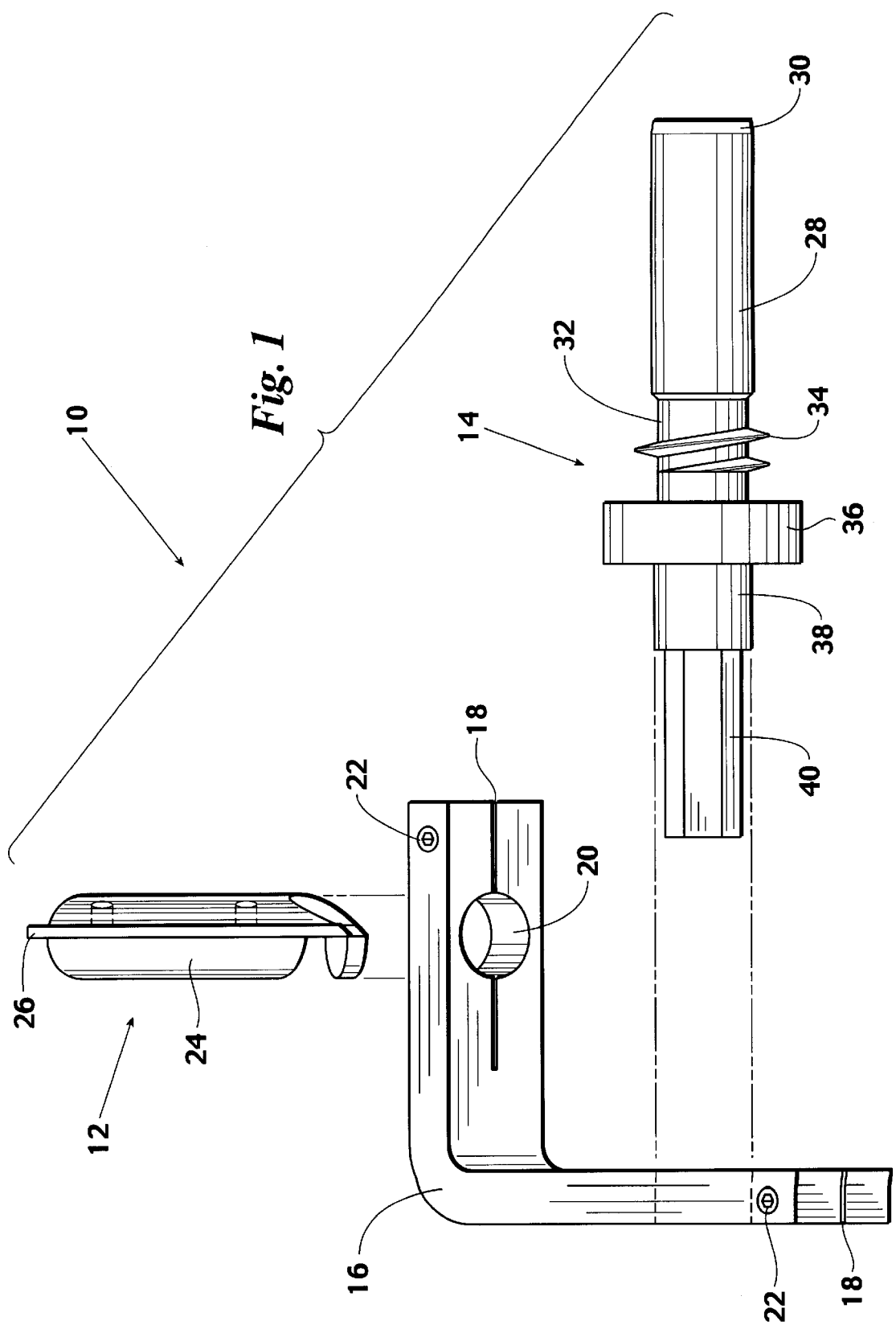
FIG. 1 is an exploded view of the preferred skiving apparatus.
Figure 2:
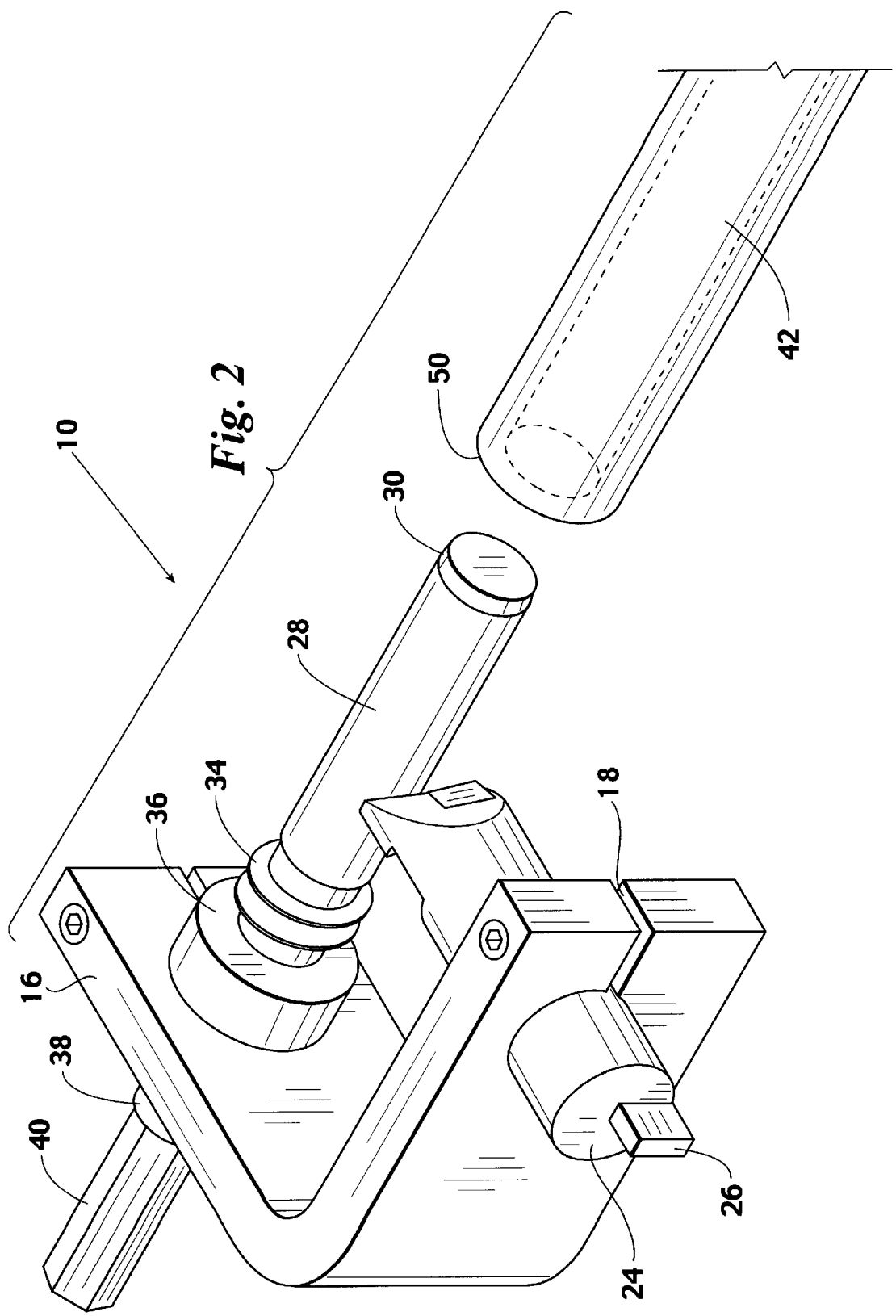
FIG. 2 is a perspective view of the preferred skiving apparatus assembled.

Referring initially to FIGS. 1 and 2, the inventive skiver, generally indicated by the reference numeral 10, is composed of three main parts—an outer diameter cutting tool 12, an internal skiving mandrel 14, and an angled bracket 16. The angled bracket 16 holds the outer diameter cutting tool 12 and the internal skiving mandrel 14 in a substantially perpendicular relation. The angled bracket 16 is preferably turned at 90° and each end thereof is provided with a machined slit 18, a holding receptacle 20, and a set screw 22. The outer diameter cutting tool 12 is insertable into one such holding receptacle 20 while the internal skiving mandrel 14 is insertable into the other. The set screws 22 are loosened or tightened as appropriate to facilitate the insertion or removal of the component parts.

The outer diameter cutting tool 12 comprises a blade holder 24 which retains an adjustable knife 26. The outer diameter cutting tool 12 can be purchased off-the-shelf, as can the angled bracket 16. The angled bracket, blade holder, and skive blade of a conventional external skiving tool, the Aeroquip FT1231, are preferred for use in connection with the illustrated internal skiving mandrel 14 to complete the inventive combination.

The crux of the present invention lies in the design of the internal skiving mandrel 14 and its combination with the prior known elements of the outer diameter cutting tool 12 and angled bracket 16. Heretofore, external skiving tools such as the Aeroquip FT1231 included a mandrel, but the sole purpose of the mandrel was to support the hose end being skived and to provide a stop to limit the depth of skiving. The conventional mandrel performs no cutting function. This is in contradistinction to the internal skiving mandrel 14 used in connection with the present invention.

The internal skiving mandrel 14 of the present invention is preferably machined from alloy 4140 round steel bar stock, and, after machining, is hardened to 58 Rockwell hardness. The mandrel 14 has a forward nose portion 28 for receiving a hose end coaxially thereover. The nose 28 has a beveled end 30 to ease the application of the hose end onto the mandrel 14 and a rearward undercut portion 32 of a reduced diameter upon which spiral cutting threads 34 are machined. The undercut 32 aids machining and the clearing of fragments. The spiral cutting threads 34 consist of about two sharpened threads which, in operation, screw into the inside wall of the hose, cut it, and, when the mandrel 14 is retracted, pull out a desired cylindrical ring section. A stop collar 36 consisting of a cylindrical increased diameter area aids skiving to the desired depth from the end of the hose. Behind the stop collar 36 is a mounting collar 38 and hexagonal shank 40. The mounting collar 38 is cylindrically shaped to be received in the holding receptacle 20 of the angled bracket 16. The hexagonal shank 40 provides a holding surface for secure gripping in a vice or spindle as hereinafter described.

The dimensions of the internal skiving mandrel 14 may be varied to accommodate different hose sizes, and, likewise, the position of the outer diameter cutting tool 12 may be adjusted to take into account the hose size and desired cut.

Figure 3:
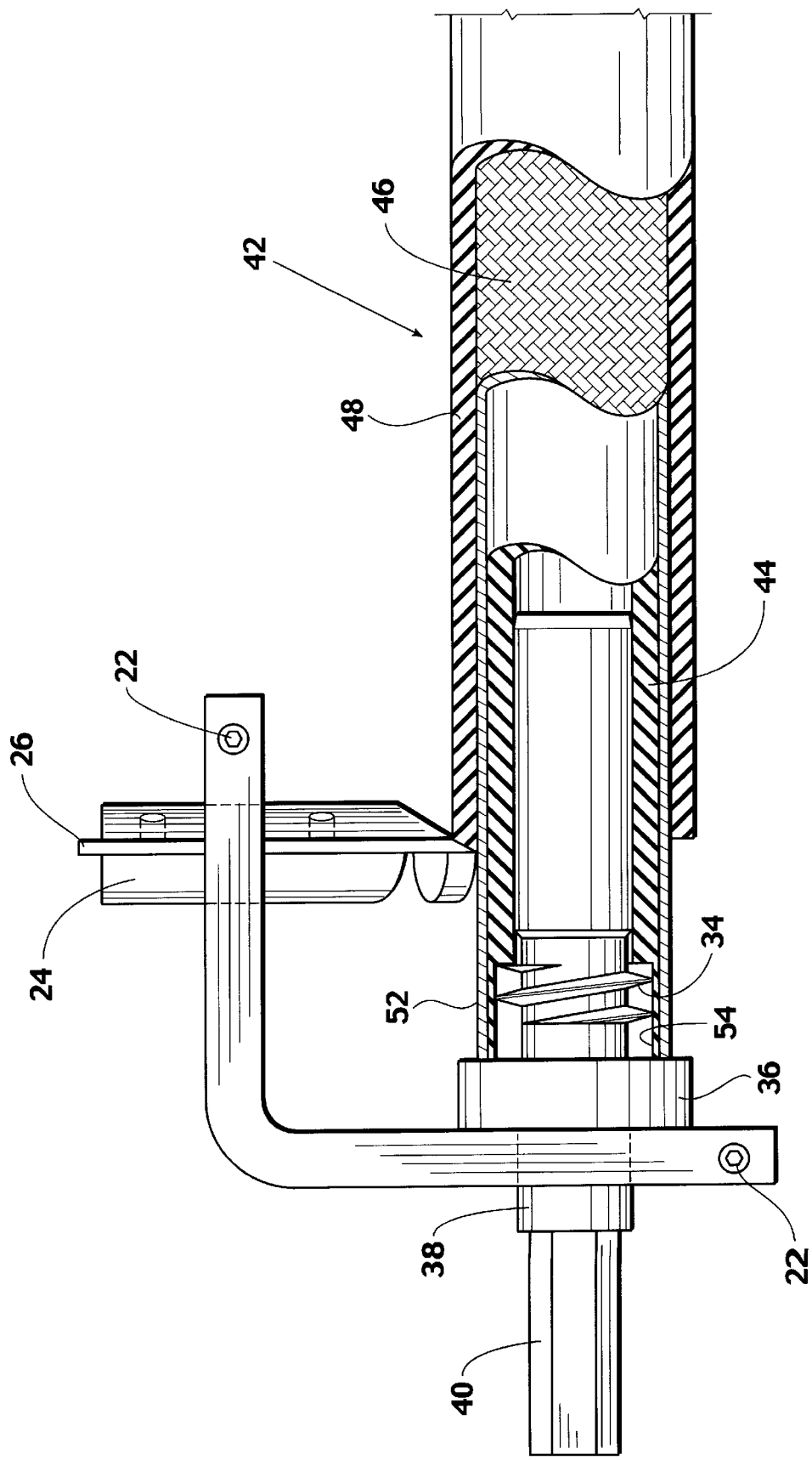
FIG. 3 is a partial sectional view of the preferred skiving apparatus in use.

FIG. 3 best illustrates the simultaneous skiving of outer and inner hose end surfaces that is achieved with the present invention. For illustration purposes, there is shown an exemplar hose 42 having an inner elastomeric wall portion 44, a wrapping of reinforcement material such as wire braid 46 or spirally wrapped wire, and an outer wall portion 48 also formed of elastomeric material or the like. As used herein in connection with descriptions of the hose 42 or hose end 50, the term "outer surface" means the outermost wall portion 48 of the hose 42, while the term "inner surface" means the innermost surface of the inner elastomeric wall portion 44.

In the simultaneous skiving operation, the hose end 50 is inserted over the nose 28 of the internal skiving mandrel 14 and either the hose 42 or the skiving apparatus 10 is rotated until the hose end 50 bottoms on the stop collar 36. A critical aspect of the invention is that the cutting direction of the outer diameter cutting tool 12 be coincident with that of the spiral cutting threads 34 of the internal skiving mandrel 14. Though it does not matter as to whether the cutting direction is a clockwise or counterclockwise direction, it is necessary for the accomplishment of the present invention that the cutting directions are, indeed, coincident. As the hose 42 is advanced along the nose 28 of the mandrel 14, and as either the hose 42 or the skiving apparatus 10 is rotated, initial skiving occurs via the outer diameter cutting tool 12 along the outer surface of the hose 42. It is generally preferred that the outer wall portion 48 of the hose 42 be removed down to the wrapped wire braid 46. This leaves the indicated outer surface skived area 52. The outer diameter cutting tool 12 and adjustable knife 26 may be arranged in angled bracket 16 so as to provide the precise cut desired. The outer diameter cutting tool 12 makes a circular cut normal to the hose 42 with one cutting blade and a second cut to skin or skive the hose with a complimentary blade. Again, the function and operation of the outer diameter cutting tool 12 is well known in the art; accordingly, it is not necessary to dwell on the particulars of the cutting process.

As the hose end 50 passes by the outer diameter cutting tool 12, it engages the spiral cutting threads 34 of the internal skiving mandrel 14. The spiral cutting threads 34 screw into the inner elastomeric wall portion 44 of the hose 42. The hose end 50 is thus pulled toward the stop collar 36. When the hose end 50 reaches the stop collar 36, the spiral cutting threads cut the inner elastomeric wall portion 44 and, when the hose is retracted, a desired cylindrical ring section is pulled out. For illustration purposes, there is shown in FIG. 3 an inner surface skived area 54, but it should be understood that the skived area 54 is not present until the hose 42 is removed from the internal skiving mandrel 14, whereupon the cylindrical ring section is removed.

In this fashion, the hose end 50 first contacts the outer diameter cutting tool 12 and, subsequently, the spiral cutting threads 34 of the internal skiving mandrel 14 to achieve the desired simultaneous skiving of the inner and outer hose end surfaces. After the skiving is complete, the end 50 of the hose 42 is withdrawn and cleaned.

Operation

Figure 4:
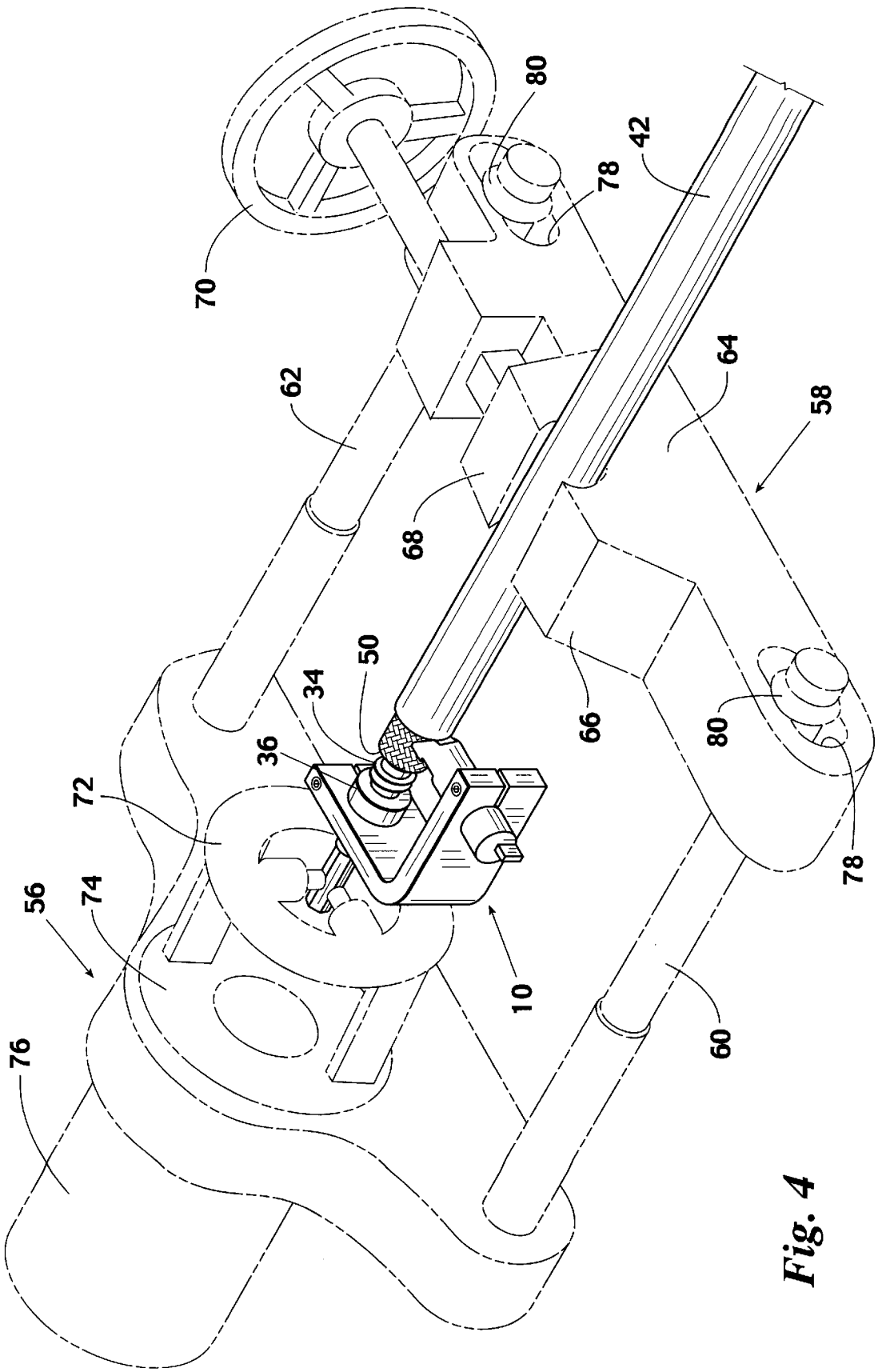
FIG. 4 is a perspective view of the preferred skiving apparatus in use mounted to the spindle of a turning machine.

The inventive skiver 10 is preferably coupled to the spindle of a reusable hose assembly machine or other turning machine. FIG. 4 illustrates an exemplar turning machine 56. The turning machine 56 is operatively connected to a longitudinally movable clamping fixture or vise 58 via two guide bars 60, 62. The clamping fixture 58 comprises a bearing block 64 which is slidably mounted upon the guide bars 60, 62. The clamping fixture 58 has a fixed jaw 66 and a movable jaw 68 which is actuated by wheel 70. A pair of slots 78 and collars 80 allow the clamping fixture 58 to be adjusted to maintain proper coaxial alignment for different hose sizes. Several conventional turning machines made be utilized in connection with the present invention such as an Aeroquip S1102 "Cutoff and Skiving Machine," an Aeroquip FT1013 "Portable Reuseable Hose Assembly Machine," or an Aeroquip FT1028 "Production Reuseable Hose Assembly Machine."

In its preferred operation, the hexagonal shank 40 of the internal skiving mandrel 14 is mounted in the chuck 72 of the turning machine spindle 74 and the spindle 74 is rotated by motor 76 at, for example, 15 rpm. The hose 42 is clamped in the jaws 66, 68 of the longitudinally movable clamping fixture 58 and, as the spindle 74 rotates, the bearing block 64 is pushed along guide bars 60, 62 so that the hose end 50 is pushed coaxially over the nose 28 of the mandrel.

Referring now to all drawing figures, the advance of the hose 42 upon the internal skiving mandrel 14 is easily controlled with the longitudinally movable clamping fixture 58. As the hose 42 advances toward the stop collar 36 of the mandrel 14, the outer wall portion 48 first engages the cutting edges of the rotating outer diameter cutting tool 12. This initiates the skiving of the outer surface of the hose 42. As the hose 42 is progressively moved toward the stop collar 36, the internal diameter of the hose 42, i.e., the inner elastomeric wall portion 44, contacts the spiral cutting threads 34. The direction of rotation need be such that the spiral cutting threads 34 screw into the inner elastomeric wall portion 44 until the hose end 50 contacts the stop collar 36. At this point, upon continued rotation of the skiving apparatus 10, a desired cylindrical ring is cut into the inner elastomeric wall portion 44. When the bearing block 64 is pulled back along guide bars 60, 62, a cylindrical ring section is pulled out of the interior of the hose 42. The hose end is then cleaned and is ready to receive a fitting.

While the invention has been described with a certain degree of particularity, it is understood that the invention is not limited to the embodiment(s) set for herein for purposes of exemplification, but is to be limited only by the scope of the attached claim or claims, including the full range of equivalency to which each element thereof is entitled.

What is claimed is:

1. A skiving apparatus, comprising an outer diameter cutting tool, an internal skiving mandrel and a bracket for holding the outer diameter cutting tool and the internal skiving mandrel in a substantially perpendicular relation, the internal skiving mandrel having a nose for coaxially receiving a hose end thereover, spiral cutting means for screwing into an inside wall portion of the hose end and cutting the inside wall portion to obtain a desired cylindrical ring section, and a stop collar, the internal skiving mandrel and the outer diameter cutting tool further having a coincident cutting direction whereby when the hose is fed over the mandrel and either the hose or the apparatus is rotated a simultaneous skiving of the inner and outer surfaces of the hose is achieved and whereupon when the hose end is retracted, the desired cylindrical ring section is pulled out.

2. The skiving apparatus according to claim 1, further comprising a turning machine having a spindle operatively connected to the internal skiving mandrel.

3. A process for simultaneously skiving the inner and outer surfaces of an end of a hose, comprising the steps of:

pushing the end of the hose over the nose of the mandrel of the skiving apparatus of claim 1 until the end bottoms on the stop collar;

rotating the skiving apparatus in the cutting direction to achieve the simultaneous skiving of the inner and outer surfaces; and withdrawing and cleaning the end of the hose.

4. The process according to claim 3, further comprising the steps of:

mounting the internal skiving mandrel of the skiving apparatus of claim 1 in a chuck of a turning machine spindle;

rotating the spindle; and pushing the end of the hose over the nose of the internal skiving mandrel until the end bottoms on the stop collar.

5. The process according to claim 4, further comprising securing the hose in a longitudinally movable clamping fixture to facilitate the achievement of the pushing step.

6. An internal skiving mandrel for use with an outer diameter cutting tool and bracket assembly, the internal skiving mandrel having a nose for coaxially receiving a hose end thereover, spiral cutting means for screwing into an inside wall portion of the hose end and cutting the inside wall portion to obtain a desired cylindrical ring section, the spiral cutting means having a cutting direction coincident to that of the outer diameter cutting tool, a stop collar, and bracket mounting means for holding the internal skiving mandrel securely within the bracket assembly in a substantially perpendicular relation to the outer diameter cutting tool.

7. The internal skiving mandrel according to claim 6, wherein the bracket mounting means is a cylindrical collar.

8. The internal skiving mandrel according to claim 6, further comprising a shank extending longitudinally behind the bracket mounting means.

9. The internal skiving mandrel according to claim 8, wherein the shank is hexagonal.

10. The internal skiving mandrel according to claim 6, wherein the nose has an undercut, reduced diameter portion in the area of the spiral cutting threads.

11. The internal skiving mandrel according to claim 6, wherein the nose has a beveled end.

* * * * *